US011767849B2

(12) United States Patent
Thomsen (10) Patent No.: US 11,767,849 B2
(45) Date of Patent: Sep. 26, 2023

(54) SELF-REGULATING OPEN CIRCUIT PUMP UNIT

(71) Applicant: S.A. Armstrong Limited, Scarborough (CA)

(72) Inventor: Peter Thomsen, Scarborough (CA)

(73) Assignee: S.A. Armstrong Limited, Scarborough (CA)

(*) Notice: Subject to any disclaimer, the term of this patent is extended or adjusted under 35 U.S.C. 154(b) by 288 days.

(21) Appl. No.: 17/338,194

(22) Filed: Jun. 3, 2021

(65) Prior Publication Data

US 2021/0293242 A1 Sep. 23, 2021

Related U.S. Application Data

(63) Continuation of application No. 16/063,601, filed as application No. PCT/CA2016/051392 on Nov. 25, 2016, now Pat. No. 11,053,945.

(Continued)

(51) Int. Cl.
*F04D 15/00* (2006.01)
*F04D 27/02* (2006.01)
(Continued)

(52) U.S. Cl.
CPC ........ *F04D 15/0066* (2013.01); *F04B 49/065* (2013.01); *F04B 49/20* (2013.01);
(Continued)

(58) Field of Classification Search
CPC ............. F04D 15/0066; F04D 15/0088; F04D 15/0209; F04D 15/029; F04D 27/00;
(Continued)

(56) References Cited

U.S. PATENT DOCUMENTS 4,208,171 A 6/1980 Jonsson
4,545,906 A 10/1985 Frederick
(Continued)

FOREIGN PATENT DOCUMENTS

EP 0390627 A1 10/1990
KR 101151636 B1 6/2012

OTHER PUBLICATIONS

Stelter et al., Solving Overpressure Problems with a Variable-Speed Fire Pump, Plumbing Systems & Design, www.psdmagazine.org, Sep. 2011, p. 20-25.
(Continued)

*Primary Examiner* — Peter J Bertheaud
(74) *Attorney, Agent, or Firm* — Bret E. Field; Bozicevic, Field & Francis LLP (57) ABSTRACT

A self-regulating fire pump unit which can be controlled to operate under required conditions for sourcing a fire protection system such as sprinklers. The fire pump unit can be operated in accordance with a control curve based on detected pressure and flow. The control curve can include: a) a first setpoint of rated total value of the system load for the pressure and the flow, b) a second setpoint of a minimum partial percentage of the rated total value of the pressure at an over-percentage of the rated total value of the flow, c) a path which maintains the rated total value of the pressure for all values of the flow up to the first setpoint, d) a path between the first setpoint and the second setpoint, e) a path from the second setpoint which limits values of the pressure for values of the flow greater than the second setpoint.

20 Claims, 6 Drawing Sheets

Related U.S. Application Data (60) Provisional application No. 62/350,038, filed on Jun. 14, 2016.

(51) Int. Cl.

| | | |
|---|---|---|
| *F04D 15/02* | (2006.01) | |
| *F04D 27/00* | (2006.01) | |
| *F04B 49/06* | (2006.01) | |
| *F04B 49/20* | (2006.01) | |
| *G05B 19/042* | (2006.01) | |
| *G05B 13/04* | (2006.01) | |
| *G05D 13/62* | (2006.01) | |

(52) U.S. Cl.
CPC ....... *F04D 15/0088* (2013.01); *F04D 15/029* (2013.01); *F04D 15/0209* (2013.01); *F04D 27/00* (2013.01); *F04D 27/0261* (2013.01); *G05B 13/041* (2013.01); *G05B 19/042* (2013.01); *G05D 13/62* (2013.01); *F04B 2203/0209* (2013.01); *F04B 2205/09* (2013.01)

(58) Field of Classification Search
CPC .... F04D 27/0261; F04B 49/065; F04B 49/20; F04B 2203/0209; F04B 2205/09; G05B 13/041; G05B 19/042; G05D 13/62
See application file for complete search history.

(56) References Cited

U.S. PATENT DOCUMENTS

| | | |
|---|---|---|
| 4,678,404 A | 7/1987 | Lorett et al. |
| 6,350,105 B1 | 2/2002 | Kobayashi et al. |
| 7,143,016 B1 | 11/2006 | Discenzo et al. |
| 8,700,221 B2 | 4/2014 | Cheng et al. |
| 9,091,259 B2 | 7/2015 | Tamminen et al. |
| 9,702,365 B2 | 7/2017 | Rosinski et al. |
| 9,823,627 B2 | 11/2017 | Acosta Gonzalez |
| 10,185,333 B2 | 1/2019 | Egan et al. |
| 2004/0247448 A1 | 12/2004 | Kunkier et al. |
| 2008/0288115 A1 | 11/2008 | Rusnak et al. |
| 2014/0005841 A1 | 1/2014 | Cheng et al. |

OTHER PUBLICATIONS

International Search Report and Written Opinion dated Jan. 9, 2017, for PCT/CA2016/051392.

Extended European Search Report for European Patent Application No. 16904857.6, dated Jan. 7, 2020, 7 pages.

SELF-REGULATING OPEN CIRCUIT PUMP UNIT

CROSS-REFERENCE TO RELATED APPLICATION(S)

This application is a continuation of U.S. patent application Ser. No. 16/063,601 filed Jun. 18, 2018, which is a U.S. National Phase Application under 35 U.S.C. § 371 of International Application No. PCT/CA2016/051392 filed Nov. 25, 2016, which claims the benefit of priority to U.S. Provisional Patent Application No. 62/350,038 filed Jun. 14, 2016 entitled SELF REGULATING OPEN CIRCUIT PUMP UNIT, all the contents of which are herein incorporated by reference into the Detailed Description of Example Embodiments herein below.

TECHNICAL FIELD

Some example embodiments relate to open circuit flow control systems, and some example embodiments relate specifically to domestic water booster pumps or to fire suppression or sprinkler pumps.

BACKGROUND

Open circuit pump systems draw fluid from a supply source and pressurize the pump discharge for a number of different objectives that include but are not limited to: providing a high operating pressure fluid supply to a valve, nozzle or other device, enabling fluid to be transported to a higher elevation or downstream, enabling fluid to pressurize an expansion balloon, or any combination of these and other objectives.

Fire pumps are used to provide pressurized flow to fire prevention systems such as sprinklers. For a fire sprinkler system, an objective of the fire pump is to boost the supply side or city main pressure to meet or exceed the design operation pressure of the sprinkler heads. The challenge on many installations is that the city main pressure can vary dramatically throughout a day, week or time of year, and the number of activated sprinkler heads is not a predictable requirement.

To enable many of the sprinkler systems to accommodate the range of operating conditions with a constant speed pump, additional components are typically added into the sprinkler distribution, such as a pressure relief valve (PRV) or pressure regulating valve. These extra components introduce more points of potential failure, maintenance requirements, and replacement requirements.

During the life of the fire pump it may also undergo regular operating testing and annual flow testing. Constant speed pumps expose themselves to, and the sprinkler piping system to, harsh stress each time they start and stop during testing. However, this may be mandatory to ensure functionality of the system over time.

Another typical installed feature is a soft starter which is used to reduce harsh stresses resulting from 'direct on-line' starters, which is a costly feature that is often included with larger conventional fire pump systems.

Additional difficulties with existing systems may be appreciated in view of the Detailed Description of Example Embodiments herein below.

SUMMARY

In accordance with some example embodiments, there is generally provided a self-regulating fire pump unit that can operate to meet required conditions.

In an example embodiment, there is provided a self-regulating fire pump such as a fire pump unit or domestic booster, for sourcing a fire protection system such as sprinklers. The fire pump can be operated in accordance with a control curve. The control curve can include a) a first setpoint of rated total value of the system load for the pressure and the flow, b) a second setpoint of a minimum partial percentage of the rated total value of the pressure at an over-percentage of the rated total value of the flow, c) a path which maintains the rated total value of the pressure for all values of the flow up to the first setpoint, d) a path between the first setpoint and the second setpoint, e) a path from the second setpoint which limits values of the pressure for values of the flow greater than the second setpoint, f) a zero flow shutoff head pressure setpoint, and g) a path from the zero flow shutoff head pressure setpoint to the path which maintains the rated total value of the pressure.

In another example embodiment, there is provided a control system for sourcing a system load, including: a variable speed device having an operable element in order to source the system load; one or more controllers configured to determine control curve information for variable operation of the operable element of the variable speed device, the control curve information being dependent on at least a first parameter and a second parameter, the first parameter and the second parameter being correlated. The control curve information can include: a) a first setpoint of rated total value of the system load for the first parameter and rated total value of the system load for the second parameter, and b) a second setpoint of a minimum partial percentage of the rated total value of the first parameter at an over-percentage of the rated total value of the second parameter. The one or more controllers are configured to: receive one or more inputs in relation to at least one of the parameters, and operate the variable speed device based on the received one or more inputs according to the control curve information.

In another example embodiment, there is provided a method for controlling a variable speed device having an operable element in order to source a system load. The method includes: determining control curve information for variable operation of the operable element of the variable speed device, the control curve information being dependent on at least a first parameter and a second parameter, the first parameter and the second parameter being correlated. The control curve information includes: a) a first setpoint of rated total value of the system load for the first parameter and rated total value of the system load for the second parameter, and b) a second setpoint of a minimum partial percentage of the rated total value of the first parameter at an over-percentage of the rated total value of the second parameter. The method further includes receiving one or more inputs in relation to at least one of the parameters, and operating the variable speed device based on the received one or more inputs according to the control curve information.

In another example embodiment, there is provided a control curve wherein a zero-flow head pressure is less than a "maximum allowed shutoff pressure", expressed as a percentage of the rated design condition head pressure.

In another example embodiment, there is provided a method for selecting a variable speed device from a plurality of variable speed devices, the variable speed device having a variably controllable motor in order to source system load, wherein control curve information of the variable speed device is dependent on at least a first parameter and a second parameter, the first parameter and the second parameter being correlated. The method includes: determining a first setpoint of rated total value of the system load for the first parameter and rated total value of the system load for the second parameter; determining a second setpoint of a minimum partial percentage of the rated total value of the first parameter at an over-percentage of the rated total value of the second parameter; and selecting the variable speed device which has the variable controllable motor having a power capacity which minimally satisfies power required to achieve the first setpoint and the second setpoint.

BRIEF DESCRIPTION OF THE DRAWINGS

Embodiments will now be described, by way of example only, with reference to the attached Figures, wherein.

Like reference numerals may be used throughout the Figures to denote similar elements and features.

DETAILED DESCRIPTION OF EXAMPLE EMBODIMENTS

Variable speed solutions for fire pump applications can be used as an economic solution that helps to save total fire sprinkler system first installed cost for designers, contractors, and to reduce maintenance challenges on site over the duration of the system's life.

In example embodiments, an intelligent variable speed pump is a pump that has an on-board ability to know its current operating conditions, and has on-board logic (intelligence) to regulate its behavior in a predetermined method of operation.

In example embodiments, an intelligent pump knows the flow that it is providing, it knows the boost pressure that it is creating, it knows the speed of the impeller, it knows the amount of power it is drawing, and/or it has a performance map for the predefined load conditions that it will encounter. In an example embodiment, the intelligent pump can perform self-diagnostics to provide useful information for predictive maintenance measures that might be too costly for most owners to consider.

In an example embodiment, the intelligent pump can be a self-regulating fire pump unit for sourcing a fire protection system such as sprinklers. The fire pump unit can be operated in accordance with a control curve. The control curve can include: a) a first setpoint of rated total value of the system load for the pressure and the flow, b) a second setpoint of a minimum partial percentage of the rated total value of the pressure at an over-percentage of the rated total value of the flow, c) a path which maintains the rated total value of the pressure for all values of the flow up to the first setpoint, d) a path between the first setpoint and the second setpoint, e) a path from the second setpoint which limits values of the pressure for values of the flow greater than the second setpoint, f) a zero flow shutoff head pressure setpoint, and g) a path from the zero flow shutoff head pressure setpoint to the path which maintains the rated total value of the pressure.

Another example embodiment is a control system for sourcing a system load, including: a variable speed device having an operable element in order to source the system load; one or more controllers configured to determine control curve information for variable operation of the operable element of the variable speed device, the control curve information being dependent on at least a first parameter and a second parameter, the first parameter and the second parameter being correlated, the control curve information including: a) a first setpoint of rated total value of the system load for the first parameter and rated total value of the system load for the second parameter, and b) a second setpoint of a minimum partial percentage of the rated total value of the first parameter at an over-percentage of the rated total value of the second parameter. The one or more controllers are configured to: receive one or more inputs in relation to at least one of the parameters, and operate the variable speed device based on the received one or more inputs according to the control curve information.

Another example embodiment is a method for controlling a variable speed device having an operable element in order to source a system load. The method includes: determining control curve information for variable operation of the operable element of the variable speed device, the control curve information being dependent on at least a first parameter and a second parameter, the first parameter and the second parameter being correlated. The control curve information includes: a) a first setpoint of rated total value of the system load for the first parameter and rated total value of the system load for the second parameter, and b) a second setpoint of a minimum partial percentage of the rated total value of the first parameter at an over-percentage of the rated total value of the second parameter. The method further includes receiving one or more inputs in relation to at least one of the parameters, and operating the variable speed device based on the received one or more inputs according to the control curve information.

Another example embodiment is a method for selecting a variable speed device from a plurality of variable speed devices, the variable speed device having a variably controllable motor in order to source system load, wherein control curve information of the variable speed device is dependent on at least a first parameter and a second parameter, the first parameter and the second parameter being correlated. The method includes: determining a first setpoint of rated total value of the system load for the first parameter and rated total value of the system load for the second parameter; determining a second setpoint of a minimum partial percentage of the rated total value of the first parameter at an over-percentage of the rated total value of the second parameter; and selecting the variable speed device which has the variable controllable motor having a power capacity which minimally satisfies power required to achieve the first setpoint and the second setpoint.

Another example embodiment is a non-transitory computer readable medium comprising instructions which, when executed by one or more controllers, cause the one or more controllers to control a variable speed device having an operable element in order to source a system load, the instructions comprising instructions for performing the described methods.

Most all pumps have a rated flow and head pressure range for which they are designed to operate. These design conditions of suction pressure, discharge pressure, speed, flow and mechanical input power define the operating efficiency of the pump. For any constant speed pump application, the actual operation conditions might temporarily or permanently drift away from the original application's design condition, causing the pump to draw more power from the driver (typically an electric motor) than was intentionally intended for that application. To prevent motor/driver failure or nuisance tripping of overcurrent protection relays, in conventional cases, the pump drivers (motors) are sized to accommodate the maximum power that the pump might require due to changes in suction pressure, discharge pressure of fluid density. The term "non-overloading motor selection" is a common phrase that describes this practice in the pump industry.

Figure 1:
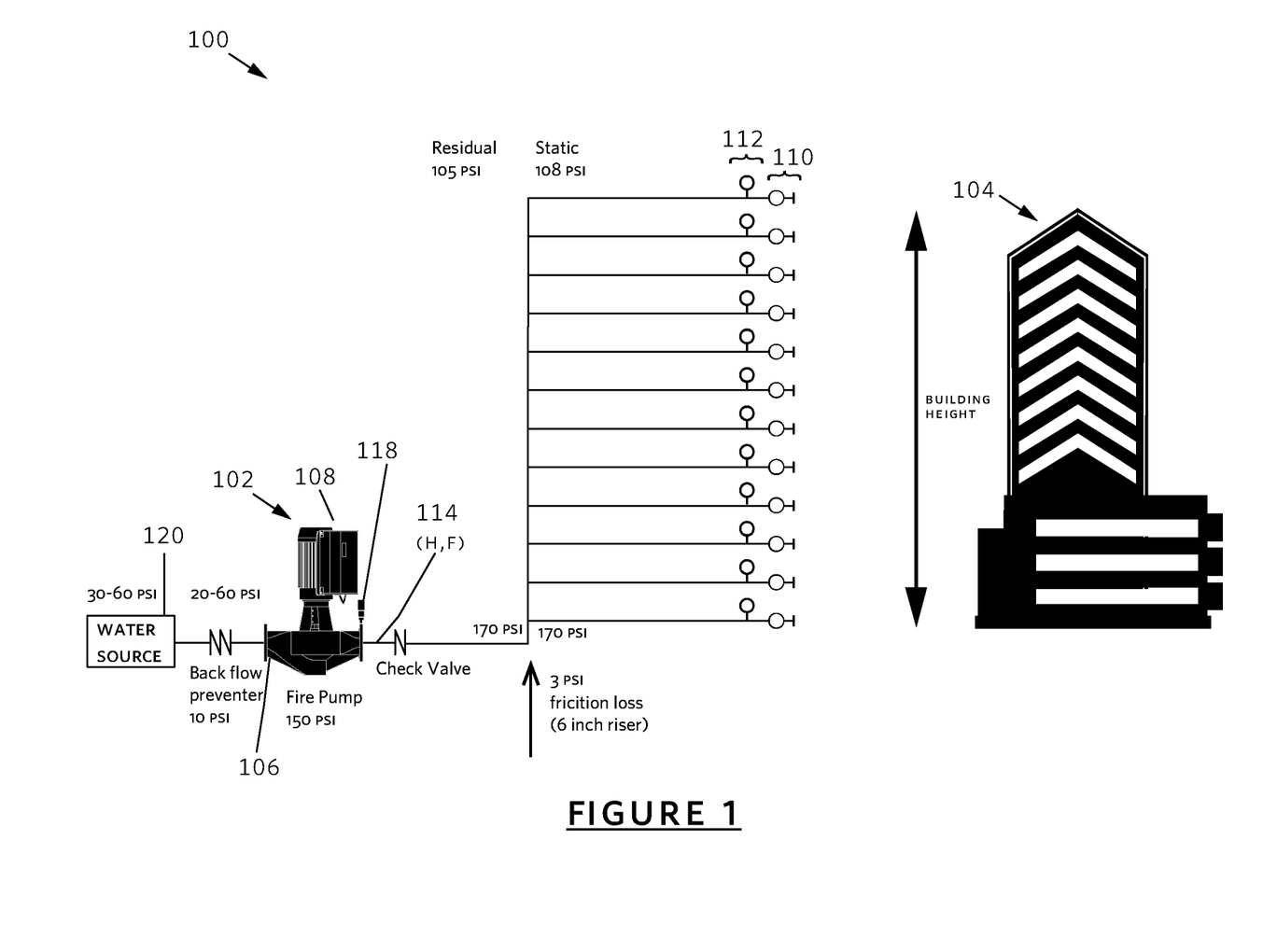
FIG. 1 illustrates an example diagram of a self-regulating fire pump and sprinkler system, in accordance with an example embodiment.

Reference is first made to FIG. 1, which shows in diagrammatic form a fire sprinkler system 100 having one or more intelligent variable speed devices such as one or more control pumps 102 (one shown), in accordance with an example embodiment. In an example embodiment, the fire prevention sprinkler system 100 is an open circuit sprinkler system for sourcing a building 104 (as shown), for sprinklers or other suitable fire prevention devices to some or all floors of the building 104. The control pump 102 may be a self-regulating fire pump unit which includes a respective pump device 106 and a driver control device 108 for controlling operation of the pump device 106. In some example embodiments, another example of the control pump 102 is a domestic water booster which can be used for water supply pressure boosting in residential, commercial and light industrial applications where low or inadequate water pressure exists, and which can be used for boosting pressure from city water supply, underground or surface water supplies.

As illustrated in FIG. 1, the sprinkler system 100 may include one or more loads 110, which can be controlled by way of fire protection valves 112 such as sprinkler valves, fire hose valves, standpipe valves, water mist valves, and/or dry pipe valves. The valves 112 and loads 110 can be in parallel (e.g. on each floor of the building 104) in some example embodiments, and/or can be in series in some example embodiments. The system load 110 may be a varying usage requirement based on activation of particular valves 112 such as on the floor where there is a fire, or required water pressure supply. In an example embodiment, each valve 112 can be of binary control (on or off) to provide maximum required water flow to address fires, and in some other open circuit scenarios, the valve 112 can be variably controlled to manage a flow rate to a respective load. As more flow is required to the overall system load 110, the control device 108 responds to this change by increasing the pump motor speed of the pump device 106 to maintain or achieve the required pressure setpoint. If less flow is required to the overall system load 110, the control device 108 responds to this change by decreasing the pump motor speed of the pump device 106 to maintain or achieve the pressure setpoint. In some example embodiments, the pressure setpoint can be set according to a control curve, described in greater detail herein.

Referring still to FIG. 1, the control pump 102 is sourced by a water source 120. The water source 120 which can be a variable pressure water source, such as from a city or municipal line. An example secondary water source 120 is ground-level or buried water tank. The control pump 102 boosts the water source 120 received at the suction-side in order to adequately supply the loads 110 of the building 104. The circulating medium in this example is an open circuit or open loop in that it is not expected that the circulating medium directly returns to the control pump 102, but rather is used to extinguish the fire. Note that, some conventional fixed speed fire pumps may do nothing or make system presumptions in order to adjust for variations in water supply-side pressure.

Referring still to FIG. 1, in an example embodiment, the output properties 114 of the control pump 102 are controlled to achieve a pressure setpoint, measured at the control pump 102, for a given flow or load requirement of the building 104. As shown in FIG. 1, a pressure sensor 118 (e.g. a pressure transducer (PT)) is used to detect pressure information local or proximal to the control pump 102. The pressure sensor 118 is integrated to the control pump 102, for example as part of an integrated factory built unit, in an example embodiment. Similarly, a local flow sensor 130 (FIG. 5) is also local or proximal to the control pump 102 to detect flow information through the control pump 102. In an example embodiment, the control pump 102 can further detect device properties such as speed of the impeller (motor speed), and the amount of power the control pump 102 is presently using.

The output properties 114 are local to the control pump 102, and can generally be controlled to achieve a fixed pressure setpoint so as to adequately source the building 104, including the most extreme load position at the height of the building 104 (or end of the line). For example, the rated total value of pressure and flow of the system load 110 for the building 104 can be determined by the system designer, and can represent a portion of or all valves 112 being open to adequately source all loads 110, for example. The pressure setpoint at the output properties 114 proximal to the pump 102 can be set so as to achieve a constant pressure, wherein that constant pressure at the output properties 114 will satisfy the rated total value of the building 104 at all flow scenarios up to the rated total value. Accordingly, in some example embodiments, remote pressure sensors are not required.

Referring still to FIG. 1, the pump device 106 may take on various forms of pumps which have variable speed control. In some example embodiments, the pump device 106 includes at least a sealed casing which houses the pump device 106, which at least defines an input element for receiving a circulating medium (suction side) and an output element for outputting the circulating medium (discharge side). The pump device 106 is a centrifugal pump in an example embodiment. The pump device 106 includes one or more operable elements, including a variable motor which can be variably controlled from the control device 108 to rotate at different speeds. The pump device 106 also includes an impeller which is operably coupled to the motor and spins based on the speed of the motor, to circulate the circulating medium. The pump device 106 may further include additional suitable operable elements or features, depending on the type of pump device 106.

The control device 108 may be used to control the motor speed of the pump device 106, for example by way of a variable speed drive (VSD) 524 (FIG. 5), sometimes also referred to as a variable frequency drive (VFD). The VSD 524 can be used to change the speed of the motor. For example, in an example embodiment, the VSD 524 converts the incoming AC power at 60 hertz (50 Hz outside the United States) to DC power and then recreates AC power at its load terminals to run the motor at the appropriate frequency commanded by the internal control loop, proportional to the frequency supplied to it. By adjusting the motor speed as the flow changes, the discharge pressure of the pump 102 can be held constant for the detected flow in accordance with a control curve, described in greater detail herein.

Figure 2:
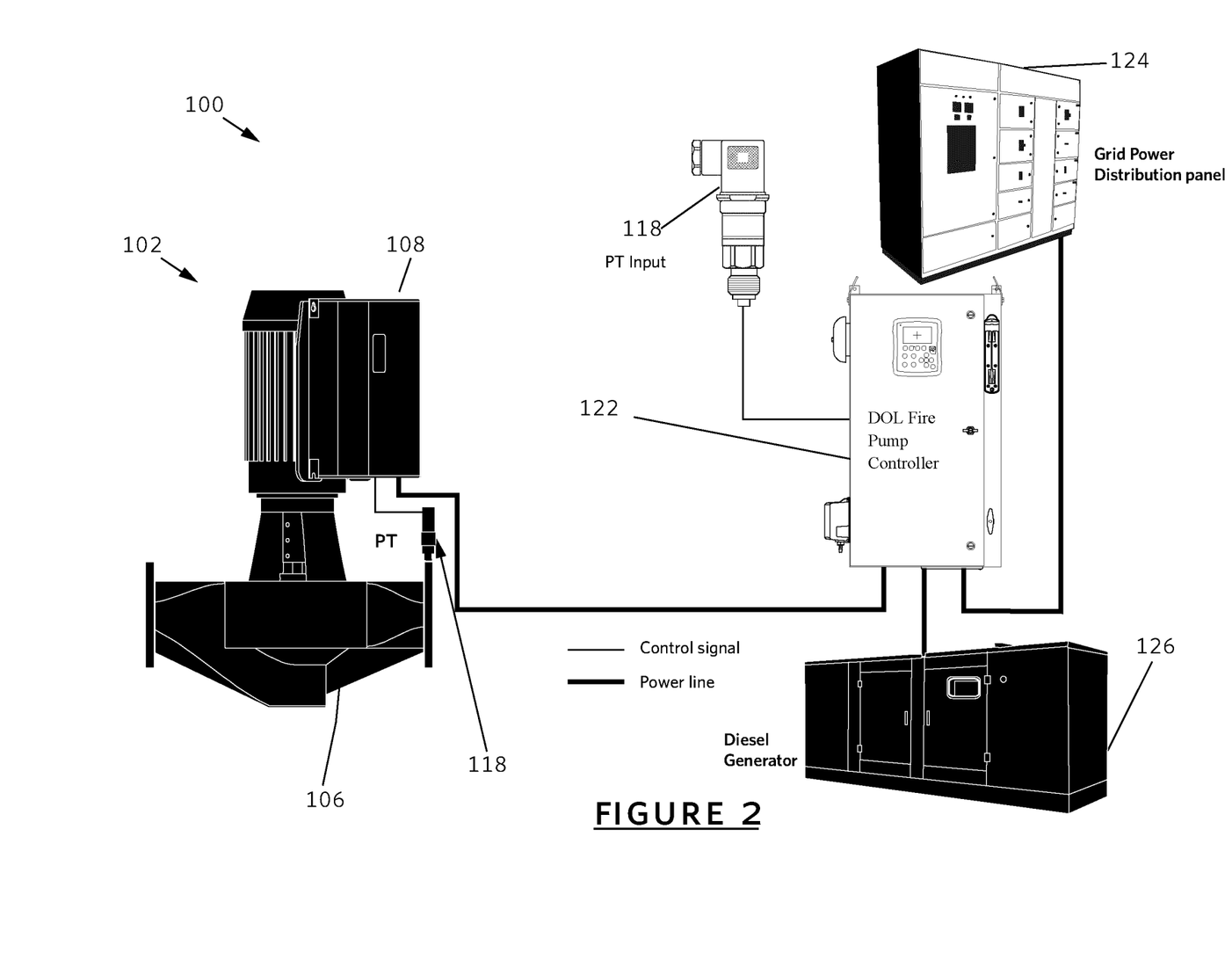
FIG. 2 illustrates an example electrical arrangement diagram of a fire pump starter arrangement for the self-regulating fire pump of FIG. 1.

Reference is now made to FIG. 2, which illustrates an example electrical system diagram of the sprinkler system 100, in accordance with an example embodiment. In the example shown, power line signal is represented by thicker lines while control signal is represented by thinner lines. The pressure sensor 118 provides pressure information to the control device 108 of the control pump 102 and other devices.

As shown in FIG. 2, an electric direct online (DOL) fire pump controller 122 can be used in an example embodiment, such as the GPA+GPU model available from TornaTech™. The electric DOL fire pump controller 122 can be used to provide high voltage power to the VSD 524 (FIG. 5) of the control device 108. The electric DOL fire pump controller 122, in example embodiments, provides full service full voltage, and has an automatic power transfer switch connected to at least one power source. The electric DOL fire pump controller 122 can be micro-processor based, in an example embodiment. Some traditional DOL electric fire pump controllers 122 may also include a starter, although it may be appreciated that a bypass or direct online (DOL) starter is not required in at least some example embodiments, but may be used for redundancy and/or to satisfy a process requirement such as a safety standard, code, regulatory body, standards or compliance requirements. For example, NFPA 20 requires an automatic bypass for the VFD in a variable-speed electric controller and a return to full speed through a governor control on a PLD diesel engine. As well, the pressure sensor 118 can provide pressure information to the electric DOL fire pump controller 122.

The electric DOL fire pump controller 122 can transfer full power to provide full voltage from more than one high power generator, such as grid power distribution power 124 and a diesel generator 126, to the control pump 102. This backup generator configuration can also be used in order to satisfy compliance requirements.

In an example embodiment, as shown in FIG. 2, the control pump 102 can be a fire pump unit that is provided as an integrated unit, with the components including the pressure sensor 118 being all in one unit or at least together in the same room location. For example, this can be more convenient to facilitate installation, maintenance, replacement, testing, and the like.

Figure 3:
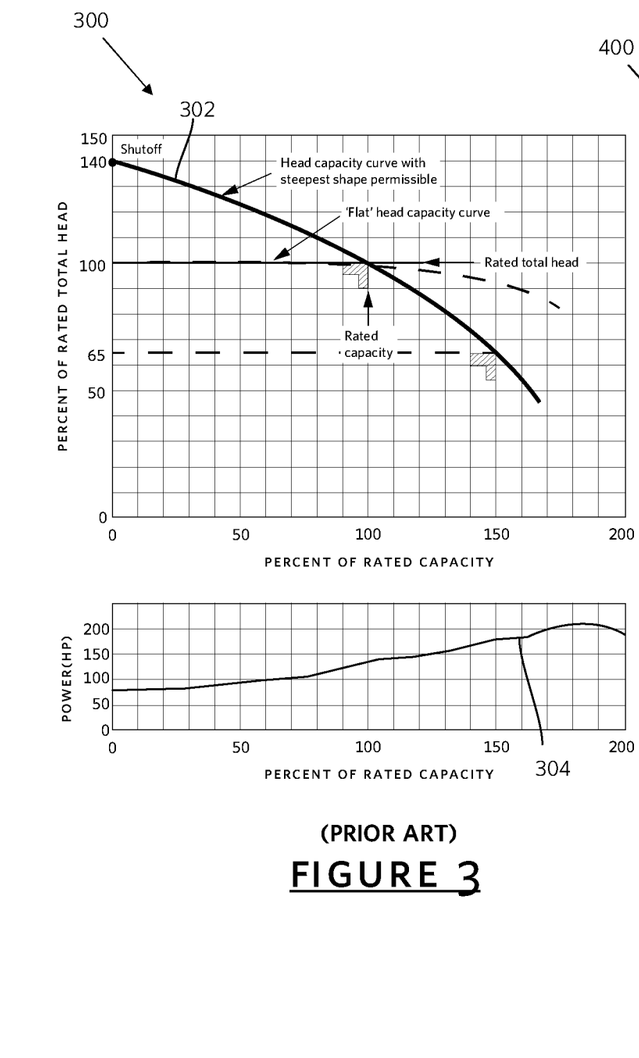
FIG. 3 illustrates an example conventional fixed speed pump curve for design criteria at shut-off head, rated flow and head, and overflow head along with a maximum power curve for a non-overloading driver selection.

Reference is now made to FIG. 3, which illustrates an example operation graph 300 of a conventional fixed speed pump, required to source a typical fire prevention system of the building 104. Generally, operation of such a fixed speed pump is required to satisfy operating conditions or total rated value of the building 104. A typical performance curve 302 and corresponding power curve 304 of the fixed speed pump is shown on the operation graph 300. When there is over-pressure at the fixed speed pump, this may require pressure relief valves (PRV), or pressure regulating valves, or other mechanisms to be used in order to relieve the over-pressure. Further, the fixed speed pump often requires a direct online (DOL) bypass starter so that initial activation of the fixed speed pump can be successfully performed. As shown by the power curve 304, the fixed speed pump requires a relatively larger non-overloading power capacity in order to effect operation and to satisfy factor-of-safety requirements at over-flow, which adds to the overall cost. For example, the fixed speed pump may require a power capacity of 200 HP. As well, the fixed fire pump may operate using presumptions regardless of the variable suction side pressure from the water supply source.

Figure 4:
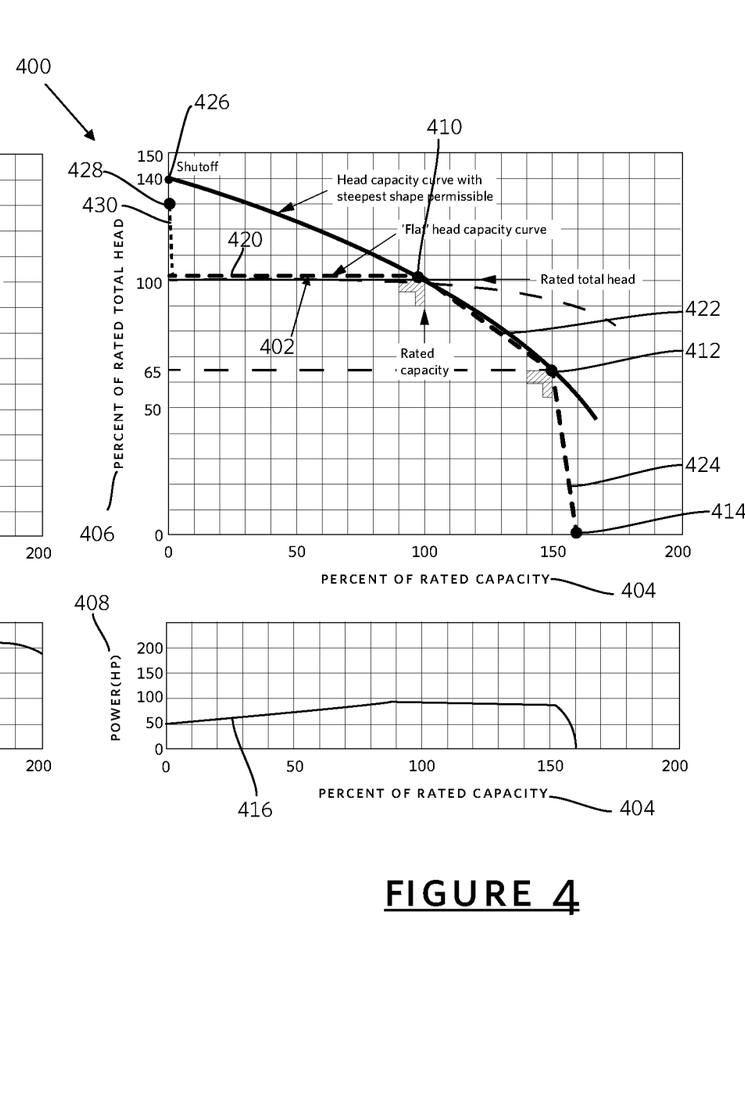
FIG. 4 illustrates, in accordance with an example embodiment, an example pump curve of the self-regulating fire pump, for shutoff head, rated flow and head, overflow head, along with a maximum power curve.

FIG. 4 illustrates an example operation graph 400 of the variable speed control pump 102, in accordance with an example embodiment. The graph 400 shows an example control curve 402 (in dashed lines) of the control pump 102, and a corresponding power curve 416, in accordance with an example embodiment.

The graph 400 includes axes which include parameters which are correlated. For example, flow squared is approximately proportional to head, and flow is approximately proportional to speed. In the example shown, the abscissa or x-axis 404 illustrates flow in U.S. gallons per minute (GPM) and the ordinate or y-axis 406 illustrates head (H) in pounds per square inch (psi) (alternatively in feet). Another y-axis 408 illustrates power in horsepower (HP). The control curve 402 is a superimposed representation of intelligent controlled operation of the variable speed control pump 102 with respect to those parameters onto the graph 400. In an example embodiment, the parameters are measured local to the control pump 102.

The relationship between parameters may be approximated by particular affinity laws, which may be affected by volume, pressure, and power or Brake Horsepower (BHP). For example, for variations in impeller diameter, at constant speed: $D1/D2=Q1/Q2$; $H1/H2=D1^2/D2^2$; $BHP1/BHP2=D1^3/D2^3$. For example, for variations in speed, with constant impeller diameter: $S1/S2=Q1/Q2$; $H1/H2=S1^2/S2^2$; $BHP1/BHP2=S1^3/S2^3$. Wherein: D=Impeller Diameter (Ins/mm); H=Pump Head (Ft/m); Q=Pump Capacity (gpm/lps); S=Speed (rpm/rps); BHP=Brake Horsepower (Shaft Power—hp/kW). These variables can work together to interact in such a way that the operation point/path of one output variable can determine or restrict the operation points of other output variables.

In an example embodiment, the control curve 402 is defined and programmed for the control pump 102, which is configured as an intelligent variable speed device. Depending on changes to the detected parameters by the pressure sensor 118 and the flow sensor 130 (FIG. 5), the operation of the pump device 106 may be maintained to operate on the control curve 402 based on instructions from the control device 108 (e.g. at a higher or lower flow point). Reference to "intelligent" devices herein includes the control pump 102 being able to self-adjust operation of the pump device 106 along the control curve 402, depending on the particular required or detected load. In some example embodiments, at least some aspects of the control curve 402 may be stored in memory 508 (FIG. 5) of the control device 108. In some example embodiments, at least some aspects of the control curve 402 may be calculated or determined, in real time or prior to operation, by the control device 108.

A first setpoint 410 of the control curve 402 is defined as rated total value of the load 110 for head and flow. This rated total value is represented as 100% head capacity and 100% flow capacity. This first setpoint 410 can be set by the system designer, and can be representative of the scenario when a portion or all valves 112 are open to source all loads 110 (flows), for example.

For example, a building 104 that has 150 feet in elevation from the discharge of the control pump 102 to the top-most fire prevention valve 112 can benefit from variable speed by the possibility of eliminating PRVs that would have been used in a traditional system. For example, for a building height of 150 feet, the pressure setpoint at the discharge of the pump 102 can be set at 175 psi, drop 65 psi due to elevation, and have 110 psi at the top-most valve 112. This leaves 10 psi for friction loss, which typically can be achieved with straight runs of 4 inch and 6 inch riser pipe.

A second setpoint 412 of the control curve 402 can be determined or calculated from the first setpoint 412, in an example embodiment. The second setpoint 412 of the control curve 402 represents a minimum partial percentage of the rated total value of head at an over-percentage of the rated total value of flow. In the example embodiment shown, the second setpoint 412 can have a minimum requirement of 65% pressure head at 150% flow with respect to the rated capacity of the building 104. In an example embodiment, the second setpoint 412 represents a factor of safety so that a minimum pressure is maintained at unforeseen scenarios where additional flow is required. For example, in an example embodiment, the second setpoint 412 represents a regulatory or standards requirement or compliance, for example as set by National Fire Prevention Association (NFPA), or other regulatory bodies, as understood in the art. For example, NFPA requires a minimum pressure of 65% pressure head at 150% flow with respect to the rated capacity of the building 104. NFPA does not have any particular requirements for greater than 150% flow.

A third setpoint 414 of the control curve 402 is a zero pressure point for flow values greater than the second setpoint 412. For example, there may be no particular pressure requirements here, and the pressure can be controlled to drop to zero pressure as fast as reasonably possible. This can reduce the required power capacity rating of the pump 102, for example.

A first path 420 of the control curve 402 extends from zero flow to the first setpoint 410. The first path 420 is for 0% to 100% of the rated flow (capacity). The first path 420 maintains the pressure setpoint for all flow values from 0% to 100% of the rated flow. The pressure value is maintained at 100% for all such flow values, up to the first setpoint 410. As can be seen, the 100% pressure setpoint is controllable so that excess pressure is not created. Accordingly, in some example embodiments, pressure relief valves (PRV) are not required for operation, for example.

A second path 422 of the control curve 402 is between the first setpoint 410 and the second setpoint 412. The second path 422 is shown as a straightline path. Other types of paths or curves may be used in other example embodiments.

A third path 424 of the control curve 402 is from the second setpoint 412 to the third setpoint 414. The third path 424 from the second setpoint 412 limits values of pressure for flow values greater than the second setpoint 412. This third path 424 can have a steeper slope or curve to zero pressure than when compared to a fixed speed device, for example. As can be appreciated, a power capacity of a control pump 102 can be selected to minimally satisfy the third path 424, typically using the second setpoint 412 as a guideline. Therefore, extra power capacity of the control pump 102 is not required for flow values greater than the second setpoint 412 or the third path 424. For example, the control pump 102 may require a power capacity of 120 HP.

Another constraint 426 is a zero flow head constraint, such as during shutoff of all of the valves 112. For example, a maximum allowed shutoff pressure can be 140% pressure at 0% flow, for example based on a process requirement or safety or regulatory compliance requirements. In an example embodiment, the control pump 102 is controlled to have a pressure setpoint for 0% flow (shutoff), which can be anywhere from the rated total value of pressure to the maximum allowed shutoff pressure, such as 100% to 140% in an example embodiment. As shown in FIG. 4, a fourth setpoint 428 is a zero flow shutoff head pressure setpoint, which can be expressed as an over-percentage of the rated pressure, such as 130%, for example. In an example embodiment, there is a fourth path 430 on the control curve 402 from the fourth setpoint 428 to the rated pressure path 420.

In an example embodiment, during startup of the control pump 102 to source the loads 110, the VSD 524 (FIG. 5) of the control pump 102 may not run at full speed but rather can gradually increase to the required setpoint, due to the variably controllable motor speed. This type of softer starting cycle does not result in typical fire motor in-rush current demands, such as what direct online (DOL) starters can experience. Further, some components in the system 100 may be less likely to experience failure during testing or when called upon. This soft startup is not particularly shown on the graph 400.

In the occasion that an external pressure sensor fails (or provides a bad reading), the control pump's 102 embedded intelligence can ensure that for a flow demand the maximum head (boost) pressure is provide for the rating of that control pump 102, in that the overflow flow rating is not exceeded, thereby removing the non-overloading motor size requirement as required in conventional cases.

During rating tests, the control pump 102 can be controlled to operate under required "fire pump" constraints as specified by some regulating bodies such as FM, as understood in the art. For example certain parameters and boundaries of the pressure and the flow may need to be tested during the rating tests.

For the control curve 402, in some other example embodiments as applicable, other example paths other than straightline between the setpoints 410, 412, 414 can include arcs, polynomial, exponential, or quadratic formulas, to provide customized or more gradual operation if desired. Additional setpoints may also be provided on the control curve 402, in some other example embodiments.

Figure 5:
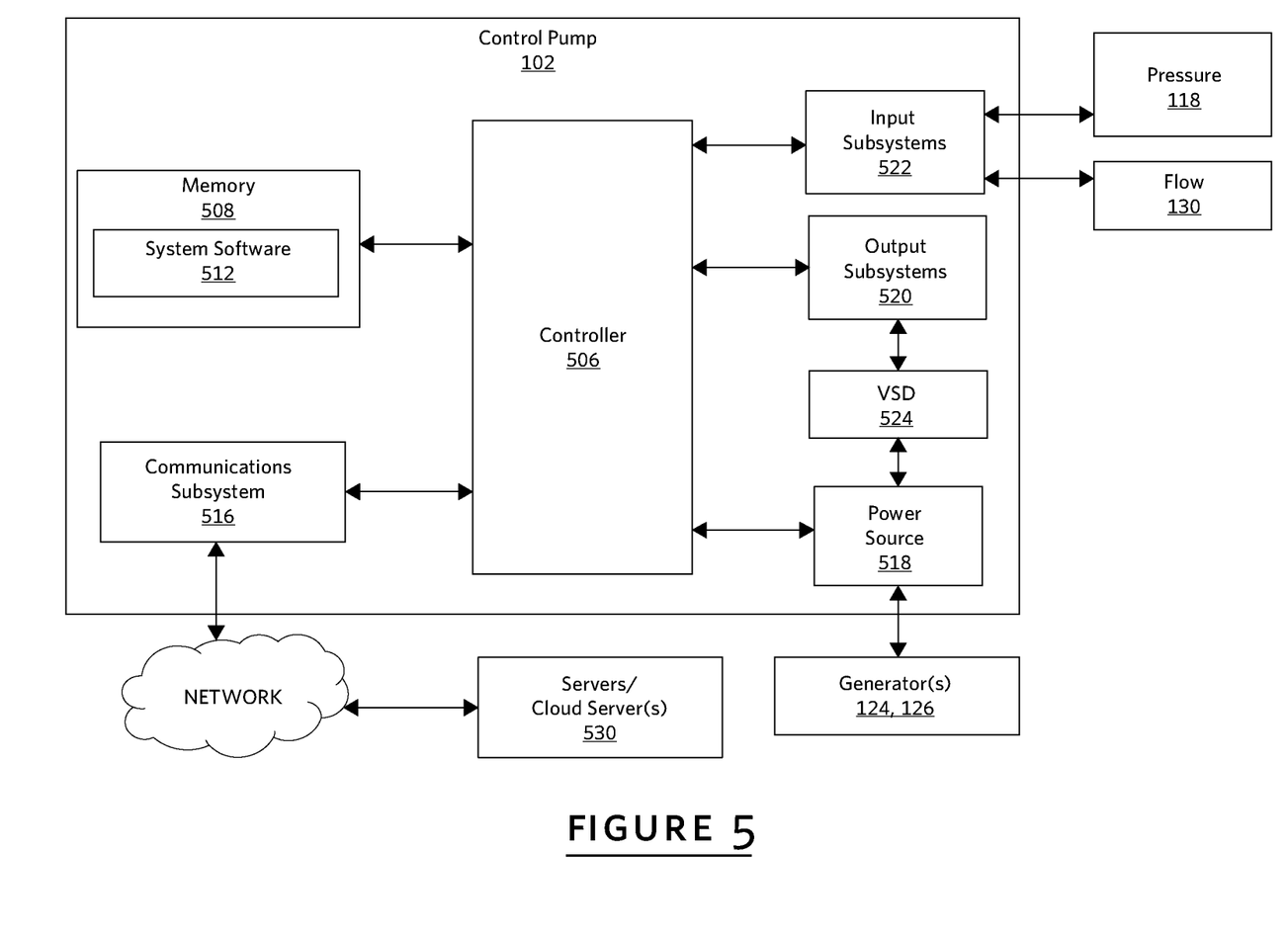
FIG. 5 illustrates an example detailed block diagram of the self-regulating fire pump, in accordance with an example embodiment.

FIG. 5 illustrates an example detailed block diagram of the control pump 102, in accordance with an example embodiment. The control pump 102, and its associated control device 108 (FIG. 1), may include one or more controllers 506 such as a processor or microprocessor, which controls the overall operation of the control pump 102. The controller 506 can also include circuitry, for example high power circuitry for high power transfer functions from the generators 124, 126. The controller 506 interacts with other device components such as memory 508, system software 512 stored in the memory 508 for executing applications, input subsystems 522, output subsystems 520, and a communications subsystem 516. A power source 518 powers the control device 108. The power source 518 can include, alone or combination with the controller 506, circuitry to directly transfer power from the generators 124, 126 to directly supply power to variable control the VSD 524.

The communications subsystem 516 is configured to communicate with, either directly or indirectly, other devices. The communications subsystem 516 may be configured for wired and/or wireless communication. The communications subsystem 516 may be configured to communicate over a network such as a Local Area Network (LAN), wireless (Wi-Fi) network, and/or the Internet. The communications subsystem 516 can send or receive communications with sensors such as the pressure sensor 118 and the flow sensor 130.

Being an intelligent device, the control device 102 can communicate with servers and/or cloud servers 530 or other higher level systems, or to cloud based analytic systems for owners to manage their total building stock, or separate buildings one by one, for example.

The input subsystems 522 can receive input variables. Input variables can include, for example, pressure information from the pressure sensor 118 and flow information from the flow sensor 130. Other example inputs may also be used, such as power and speed. Input variables can include, for example, a fire prevention alert that informs the control pump 102 that a fire is occurring that needs to be addressed by way of the fire prevention valves 112. The output subsystems 520 can control output variables, for example one or more operable elements of the control pump 102, by way of the VSD 524. For example, the output subsystems 520 may be configured to control at least the speed of the motor of the control pump 102 in order to achieve a resultant desired output setpoint for the head and flow (H, F) output properties 114 (FIG. 1), for example to operate the control pump 102 onto the control curve 402 (FIG. 4). Other example outputs variables, operable elements, and device properties may also be controlled.

The control curve 402 (FIG. 4) can have some or all of the information stored in the memory 508, calculated or determined in real-time, predetermined prior to operation, and/or received over the communications subsystem 516. Other information pertinent to the system or building 104 (FIG. 1) can be stored in the memory 508.

Figure 6:
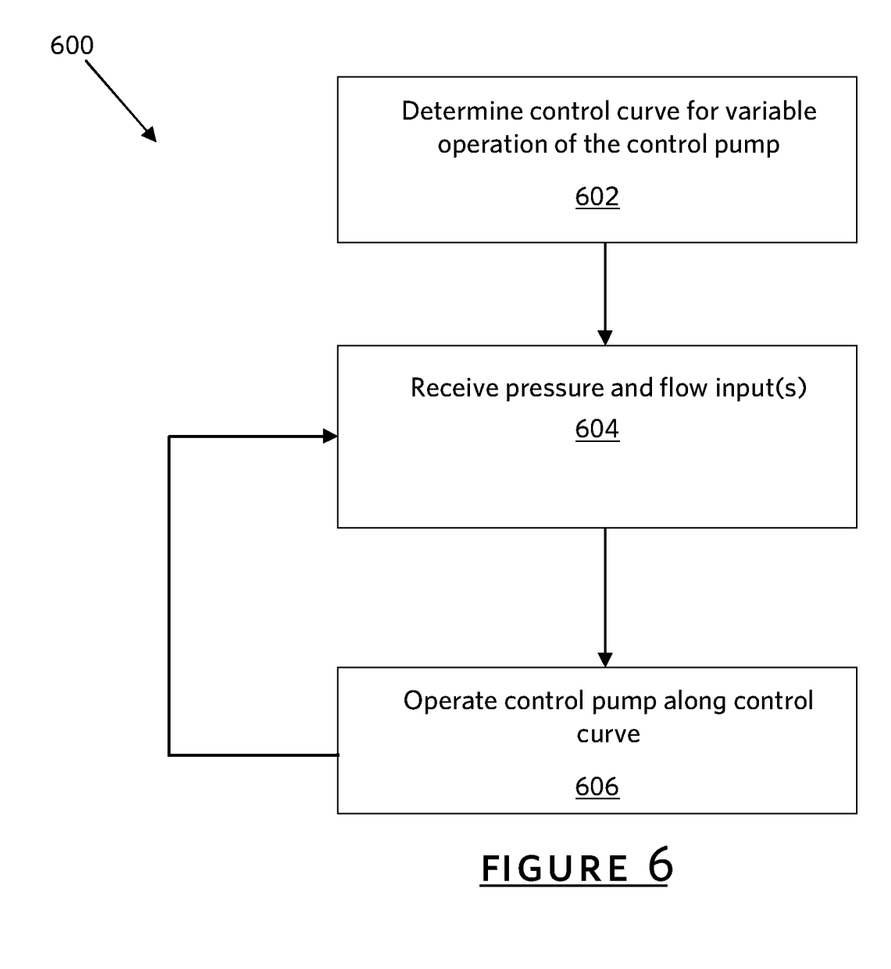
FIG. 6 illustrates a flow diagram of an example method for operating the self-regulating fire pump, in accordance with an example embodiment.

Reference is now made to FIG. 6, which illustrates a flow diagram of an example method 600 for operating the variable speed control pump 102, in accordance with an example embodiment. In an example embodiment, the method 600 is performed by the controller 506 (FIG. 5). At event 602, the method 600 includes determining of the control curve 402 for variable operation of the control pump 102. In an example embodiment, a first parameter of the control curve 402 can be pressure, and a second parameter of the control curve 402 can be flow. The control curve 402 information can include, in an example embodiment, with reference to FIG. 4: a) the first setpoint 410 of rated total value of the system load for the first parameter and rated total value of the system load for the second parameter; b) the second setpoint 412 of a minimum partial percentage of the rated total value of the first parameter at an over-percentage of the rated total value of the second parameter; c) the path 420 which maintains the rated total value of the first parameter for all values of the second parameter up to the first setpoint 410; d) the path 422 between the first setpoint 410 and the second setpoint 412; and e) the path 424 from the second setpoint 412 which limits values of the first parameter for values of the second parameter greater than the second setpoint 412.

At event 604, the method 600 includes receiving one or more inputs in relation to at least one of the parameters. Typically, this includes the pressure information from the pressure sensor 118 and flow information from the flow sensor 130.

At event 606, the method 600 includes operating the VSD 524 of the control pump 102 based on the received one or more inputs according to the control curve 402. In an example embodiment, the receiving event 604 and the operating event 606 are performed in a loop, for example until such time as the fire has been addressed.

Figure 7:
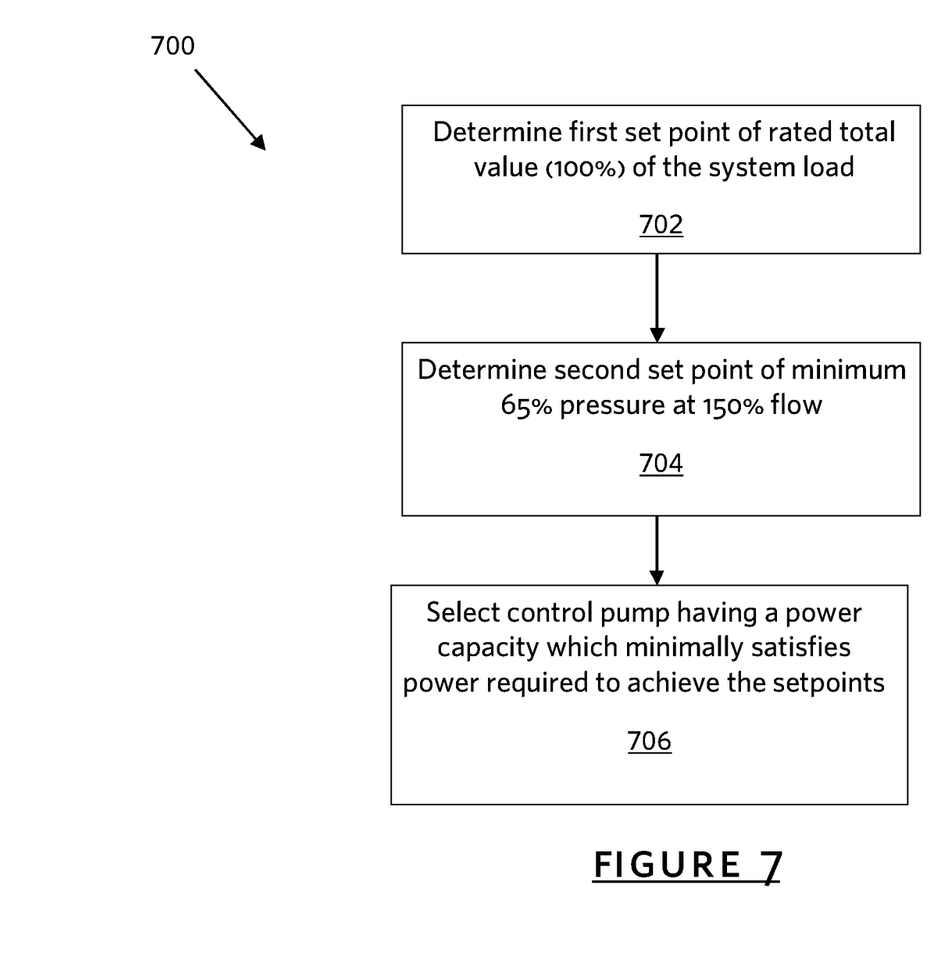
FIG. 7 illustrates a flow diagram of an example method for selecting a self-regulating fire pump from a plurality of fire pumps, in accordance with an example embodiment.

FIG. 7 illustrates a flow diagram of an example method 700 for selecting a suitable variable speed control pump 102 from a plurality of variable speed control pumps in order to source system load of the building 104, in accordance with an example embodiment. In an example embodiment, the method 700 is performed by one or more controllers. In an example embodiment, a first parameter of the control curve 402 can be pressure, and a second parameter of the control curve 402 can be flow.

At event 702, the method 700 includes determining the first setpoint 410 (FIG. 4) of 100% rated total value of the system load for the first parameter and 100% rated total value of the system load for the second parameter. This value be set by the system designer and retrieved from memory, in an example embodiment. At event 704, the method 700 includes determining the second setpoint 412 (FIG. 4) of a minimum partial percentage of the rated total value of the first parameter at an over-percentage of the rated total value of the second parameter. This can be calculated from the first setpoint 410, or retrieved from memory.

At event 706, the method 700 includes selecting the variable speed device which has the variable controllable motor having a power capacity which minimally satisfies power required to achieve the first setpoint and the second setpoint.

For example, for flows greater than the second setpoint 414, the pressure can be limited, down to a zero pressure point on the control curve 402. For example, there may be no particular pressure requirements here, and the pressure can be controlled to drop to zero pressure as fast as reasonably possible. This can reduce the required power capacity rating of the pump 102, for example.

For example, a number of control pumps 102 can be sorted by power capacity or power rating. The control pump 102 to be selected can be from a group of rated fire pump units or domestic water boosters, for example. The control pump 102 that is selected is one that satisfies these criteria without having unnecessary over-capacity of power. This can reduce startup and replacement costs of the system. The driver size of the selected control pump 102 will not be subject to the drastic multiples of the 'rating' requirements as in fixed speed fire pumps, as the embedded intelligence in example embodiments will manage the flow and head curve to the rated pump requirements (for flow and head).

Once the control pump 102 is selected, the selected control pump 102 can be installed and programmed to operate to circulate a circulating medium to source the fire prevention systems of the building 104. The control pump 102 can then operate, for example by performing the exemplary method 600 as described with respect to FIG. 6. Operation of the control pump 102 would therefore not exceed the power capacity rating, while saving costs by not having to provide equipment to supply that over-capacity of power.

In an example embodiment, the method 700 is performed by one or more controllers of a server device and accessible via a web portal or web application over a network connection such as the Internet.

In view of the foregoing, the use of intelligent variable speed pump technology in example embodiments can be used for life safety systems through fire suppression systems such as fire sprinkler systems.

In example embodiments, the intelligent fire pumps can regulate themselves to not operate in a flow condition that is beyond the design requirements of the installation, through the fact that they know what that maximum flow requirement is, and know what flow they are producing.

In example embodiments, the variable speed pumping can be provided as a "VFD on the wall" which is an economic approach for the total system design. The control pump 102 and the pressure sensor 118 can be provided as part of an integrated factory built unit as a singular product. Features of the self-regulating variable speed pump units comprise of: the mechanical pump, the on-board controller, the variable speed drive, and the electric motor.

Integrated intelligent pumps can be more reliable from an integrated system assembly relative to loose field components from multiple vendors as the factory integration approach ensures that extensive testing is performed to ensure the best compatibility between the elements of the integrated intelligent pump relative to field assembled approach.

The intelligent self-regulating pump unit can provide a lower life cycle cost for some or all of the following reasons. The first installed cost is lower. The maintenance cost associated with single or multiple PRVs is eliminated. Drain risers are no longer required. Customer can take advantage of the self-flow and boost pressure information from the intelligent pump in place of more time manual documentation. Replacement parts are smaller and less costly.

In other example embodiments, some other example parameters can be used as the operation graph and control curve, instead of pressure and flow. Internal detectors or sensors can be used, typically referred to in the art as a "sensorless" control pump because an external sensor is not required. The internal detector may be configured to self-detect, for example, device properties such as the power and speed of the motor on the pump. Other input variables may be detected.

Variations may be made in some example embodiments. Some example embodiments may be applied to any variable speed device, and not limited to variable speed control pumps. For example, some additional embodiments may use different parameters or variables, and may use more than two parameters (e.g. three parameters on a three dimensional graph). For example, the speed (rpm) and power (BHP) may also be used as parameters on the described control curves. Further, temperature (Fahrenheit) versus temperature load (BTU/hr) may be parameters or variables which are considered for control curves, for example for variable temperature control which can be controlled by a variable speed circulating fan. Some example embodiments may be applied to any devices which are dependent on two or more correlated parameters. Some example embodiments can include variables dependent on parameters or variables such as liquid, temperature, viscosity, suction pressure, site elevation and number of pump operating.

In some example embodiments, as appropriate, each illustrated block or module may represent software, hardware, or a combination of hardware and software. Further, some of the blocks or modules may be combined in other example embodiments, and more or less blocks or modules may be present in other example embodiments. Furthermore, some of the blocks or modules may be separated into a number of sub-blocks or sub-modules in other embodiments.

While some of the present embodiments are described in terms of methods, a person of ordinary skill in the art will understand that present embodiments are also directed to various apparatus including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods and systems. It is understood that such apparatus, articles of manufacture, and computer data signals also come within the scope of the present example embodiments.

While some of the above examples have been described as occurring in a particular order, it will be appreciated to persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

The invention claimed is:

1. A method comprising:
   determining, for a system load having a first parameter comprising a pressure parameter and a second parameter comprising a flow parameter in which the first parameter and the second parameter are correlated, a first setpoint of both rated total value of the system load for the first parameter and rated total value of the system load for the second parameter;

determining a second setpoint of both a minimum partial percentage of the rated total value of the first parameter at a percentage over 100% of the rated total value of the second parameter; and selecting a variable speed device having control curve information dependent on at least the first parameter and the second parameter which has a variable controllable motor having a power capacity which minimally satisfies power required to achieve the first setpoint and the second setpoint.

2. The method as claimed in claim 1, wherein the variable speed device is selected from a plurality of variable speed devices.

3. The method as claimed in claim 1, wherein power demand of the variable speed device is limited to a maximum of said first setpoint and said second setpoint, wherein the selecting of the variable speed device includes the variable controllable motor accommodating the power required to achieve said maximum of said first setpoint and said second setpoint.

4. The method as claimed in claim 1, wherein for the second setpoint the minimum partial percentage and the percentage over 100% are set by a process requirement.

5. The method as claimed in claim 1, further comprising determining power curve information corresponding to the control curve information, the power curve information including the power required for the variable speed device to achieve the first setpoint and the second setpoint.

6. The method as claimed in claim 5, wherein the power curve information includes the power required versus the second parameter.

7. The method as claimed in claim 5, wherein the power curve information includes a maximum of the power required for the power capacity of the variable speed device to achieve the first setpoint and the second setpoint.

8. The method as claimed in claim 1, wherein the variable speed device comprises a pump.

9. The method as claimed in claim 8, wherein the pump is a fire pump.

10. The method as claimed in claim 1, wherein the system load comprises one or more fire protection valves.

11. The method as claimed in claim 1, wherein the system load comprises one or more loads which are sourced in an open circuit by the variable speed device.

12. The method as claimed in claim 1, further comprising: receiving one or more inputs in relation to the first parameter and/or the second parameter; and operating the variable speed device according to the control curve information to source the system load.

13. The method as claimed in claim 1, wherein the control curve information further comprises:

a path which maintains the rated total value of the first parameter for all values of the second parameter up to the first setpoint.

14. The method as claimed in claim 1, wherein the control curve information further comprises:

a path between the first setpoint and the second setpoint.

15. The method as claimed in claim 1, wherein the control curve information further comprises:

a path from the second setpoint which limits values of the first parameter for values of the second parameter greater than the second setpoint.

16. The method as claimed in claim 13, wherein the control curve information further comprises:

a further setpoint of at least 100% of the rated total value of the first parameter for shutoff or zero value of the second parameter, and a path from the further setpoint to the path which maintains the rated total value of the first parameter.

17. The method as claimed in claim 1, wherein the method is performed by one or more controllers.

18. A system comprising:

one or more controllers configured to:

determine, for a system load having a first parameter comprising a pressure parameter and a second parameter comprising a flow parameter in which the first parameter and the second parameter are correlated, a first setpoint of both rated total value of the system load for the first parameter and rated total value of the system load for the second parameter;

determine a second setpoint of both a minimum partial percentage of the rated total value of the first parameter at a percentage over 100% of the rated total value of the second parameter; and select a variable speed device having control curve information dependent on at least the first parameter and the second parameter which has a variable controllable motor having a power capacity which minimally satisfies power required to achieve the first setpoint and the second setpoint.

19. The system as claimed in claim 18, further comprising the variable speed device, wherein the variable speed device is operated according to the control curve information to source the system load.

20. A non-transitory computer readable medium comprising instructions which, when executed by one or more controllers, cause the one or more controllers to perform a method, the instructions comprising:

instructions for determining, for a system load having a first parameter comprising a pressure parameter and a second parameter comprising a flow parameter in which the first parameter and the second parameter are correlated, a first setpoint of both rated total value of the system load for the first parameter and rated total value of the system load for the second parameter;

instructions for determining a second setpoint of both a minimum partial percentage of the rated total value of the first parameter at a percentage over 100% of the rated total value of the second parameter; and instructions for selecting a variable speed device having control curve information dependent on at least the first parameter and the second parameter which has a variable controllable motor having a power capacity which minimally satisfies power required to achieve the first setpoint and the second setpoint.

* * * * *